(12) United States Patent
Zhu et al.

(10) Patent No.: US 6,990,890 B2
(45) Date of Patent: Jan. 31, 2006

(54) MONOBLOC PISTON HAVING OPEN FLOOR

(75) Inventors: Xiluo Zhu, Ann Arbor, MI (US);
Randall R. Gaiser, Chelsea, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/700,657

(22) Filed: Nov. 4, 2003

(65) Prior Publication Data

US 2004/0144247 A1 Jul. 29, 2004

Related U.S. Application Data

(60) Provisional application No. 60/424,127, filed on Nov. 6, 2002.

(51) Int. Cl.
*F01B 31/10* (2006.01)

(52) U.S. Cl. .............. 92/159; 92/217; 92/239
(58) Field of Classification Search ........... 92/159, 92/160, 216, 217, 238, 239
See application file for complete search history.

(56) References Cited

U.S. PATENT DOCUMENTS

| | | | |
|---|---|---|---|
| 3,413,897 A | 12/1968 | Atkin | |
| 4,470,375 A | 9/1984 | Showalter | |
| 5,081,968 A * | 1/1992 | Bruni | 92/217 |
| 5,230,148 A | 7/1993 | Martins Leites et al. | |
| 5,261,363 A | 11/1993 | Kemnitz | |
| 5,778,533 A | 7/1998 | Kemnitz | |
| 6,152,016 A | 11/2000 | Bahr et al. | |
| 6,371,061 B2 * | 4/2002 | Lash | 123/41.35 |
| 6,494,170 B2 * | 12/2002 | Moloney et al. | 123/41.35 |
| 6,588,320 B2 * | 7/2003 | Gaiser et al. | 92/231 |
| 2001/0025568 A1 | 10/2001 | Kemnitz et al. | |
| 2001/0027607 A1 | 10/2001 | Ries | |

* cited by examiner

*Primary Examiner*—Thomas E. Lazo
(74) *Attorney, Agent, or Firm*—Howard & Howard

(57) ABSTRACT

A monobloc piston assembly has at least two parts fixedly joined together forming a piston body having an oil cooling gallery. The oil cooling gallery is defined by an upper wall, a lower wall, and a pair of radially spaced inner and outer annular walls. A skirt is formed as one piece and of the same material with at least one of the two parts and depends generally along a longitudinal axis from the lower wall. A pair of pin bosses are spaced laterally from the longitudinal axis and depend generally from the lower wall. At least one elongated opening extends generally between the pin bosses with the opening preferably spanning a substantial portion of the distance between the pin bosses. Oil flows into and out of an oil cooling gallery through the opening.

20 Claims, 3 Drawing Sheets

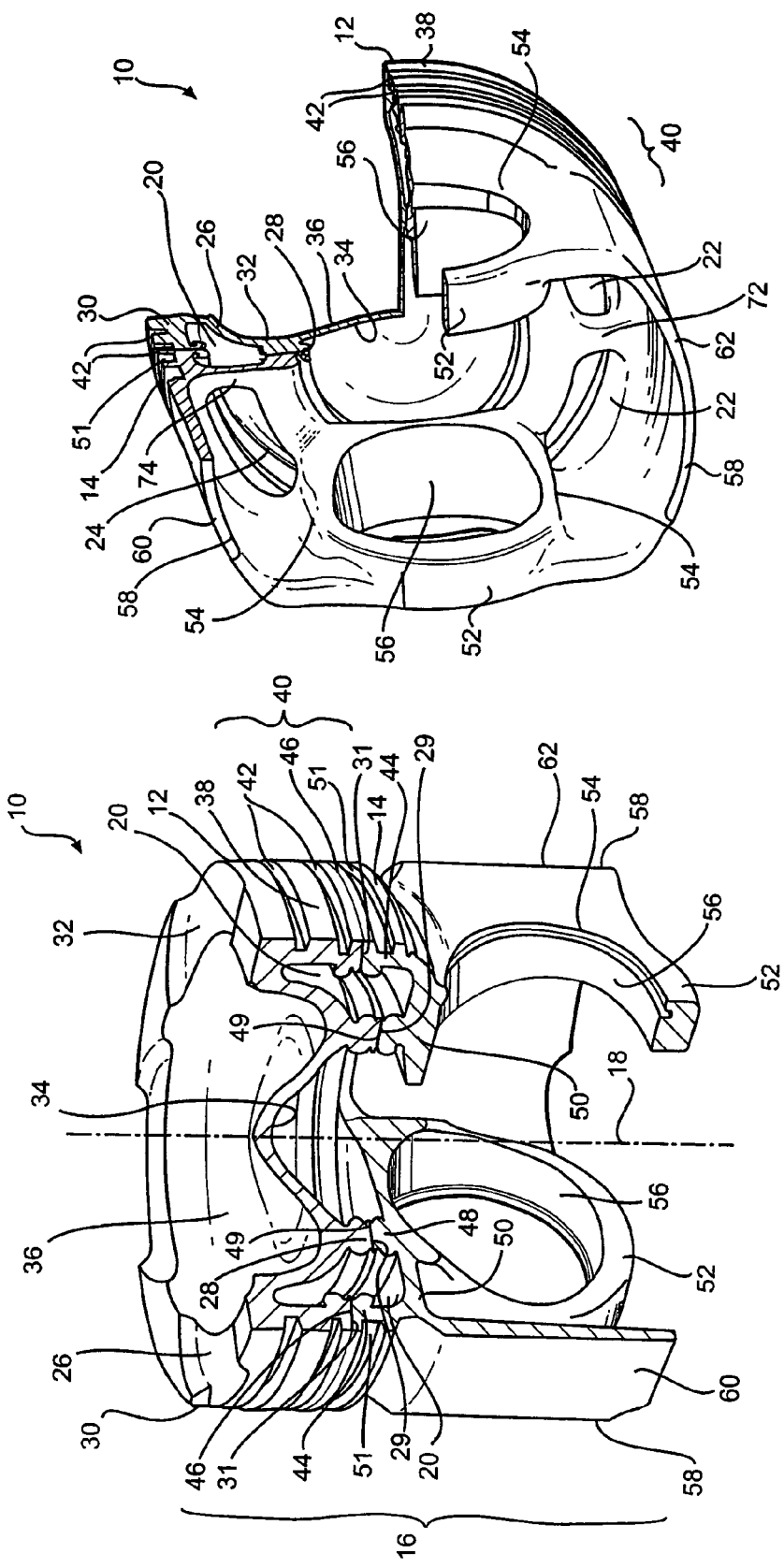

MONOBLOC PISTON HAVING OPEN FLOOR

This application claims the benefit of U.S. Provisional Application No. 60/424,127, filed Nov. 6, 2002.

BACKGROUND OF THE INVENTION

1. Technical Field

This invention relates generally to monobloc pistons for diesel engine applications, and more particularly to the construction of oil cooling galleries within monobloc pistons.

2. Related Art

In diesel engine applications, either so-called monobloc piston assemblies or articulated piston assemblies are typically used. Articulated pistons have a piston head with a separate skirt that is free to pivot relative to the piston head throughout a stroke of the piston, whereas the monobloc pistons have a piston head unitized with a skirt, such that the skirt is immovable relative to the head. Due to the severe heat that is generated in diesel engine applications, regardless of whether an articulated or monobloc construction is used, typically an oil cooling gallery is provided in the piston head to facilitate cooling the piston head.

In an articulated piston construction, the oil cooling gallery is typically provided having an "open-bottomed" construction. An opened-bottomed construction is advantageous in that oil is free to enter the oil cooling gallery from a sweeping range of angles throughout a stroke of the piston. This allows the oil to hit various portions of the oil gallery, thereby enhancing the cooling effect to the piston head. As such, with an open bottomed gallery, the orientation of oil jets responsible for injecting oil toward the gallery is not of critical concern. Typically, the oil jets are arranged at an angle relative to a longitudinal axis of the piston assembly to provide the sweeping range of angle or pattern of oil directed toward and into the oil gallery.

In contrast to the articulated construction having an open-bottomed gallery, the monobloc construction typically incorporates a bottom wall from which the unitized skirt depends, and wherein the bottom wall substantially encloses the oil gallery. The bottom wall provides the structural integrity desired to inhibit unwanted deflection of the unitized skirt that could lessen the useful life of the piston assembly. To provide for oil flow into and out of the substantially closed oil gallery, generally circular openings are typically provided in the bottom wall. As a result of having generally circular openings, the orientation of the oil jets must be directed so that the oil can enter the oil gallery, preferably throughout the stroke of the piston. This requires the oil jets to be oriented generally vertically, or parallel to the longitudinal axis of the piston, so that the oil is injected directly into the generally circular opening in the bottom wall.

As a result of the differences between the two different oil gallery constructions above, and particularly with regard to the injection of oil into the oil galleries, the two different constructions are largely incompatible with one another. As such, in service, it is necessary to replace articulated pistons with articulated pistons, and monobloc pistons with monobloc pistons. If a monobloc piston with the above construction were interchanged with an articulated piston with the above construction, inadequate oil flow into the oil gallery of the monobloc piston would result. This is due to the arrangement of the oil jets with the two different constructions. A pre-existing angled oil jet used in an articulated piston application would not be able to direct oil into the generally circular opening of a monobloc piston, thus causing the monobloc piston to overheat and seize within the cylinder bore. On the other hand, if an articulated piston were incorporated in a monobloc piston application, the advantageous sweeping pattern of oil would be lost due to having a vertically arranged oil jet. This too would likely lead to a reduced life for the articulated piston assembly.

SUMMARY OF THE INVENTION

A monobloc piston assembly is provided having at least one elongated opening extending generally between a pair of pin bosses with the opening spanning a substantial portion of the distance between the pin bosses allowing oil to flow into and out of an oil cooling gallery through the opening. The monobloc piston assembly has at least two parts fixedly joined together forming a piston body extending along a longitudinal axis. An upper wall is constructed by at least one of the two parts and has an upper surface and a lower surface with a combustion bowl formed in the upper surface. A lower wall constructed by at least one of the two parts is spaced from the upper wall along the longitudinal axis. The pair of pin bosses are spaced laterally from the longitudinal axis and depend generally parallel to the longitudinal axis from the lower wall. A skirt is formed as one piece and of the same material with at least one of the two parts and depends generally from the lower wall. At least one of the two parts forms an outer annular wall and an inner annular wall. The inner annular wall is spaced radially inwardly from the outer annular wall with the lower and upper walls joining the inner and outer annular walls to define the oil cooling gallery generally concentrically about the longitudinal axis.

One advantage of the present invention is that a monobloc piston assembly is constructed having an oil cooling gallery with a lower wall providing for oil flow through an opening in the lower wall at angles inclined to a longitudinal axis of the piston assembly.

Another advantage of the present invention is that a monobloc piston assembly provides for oil flow directed from inclined oil jets into and out of an oil gallery throughout a stroke of the piston while maintaining a desirable stiffness of a skirt wall to enhance the useful life of the piston assembly. Another advantage of the present invention is that a presently preferred construction of a monobloc piston assembly is interchangeable with a diesel engine having inclined oil jets.

Another advantage of the present invention is that the monobloc piston assembly is of relatively easy and economical manufacture.

The above list of objects, features, and advantages is not meant to be a comprehensive list, as one skilled in the art will readily recognize other objects, features, and advantages upon viewing this disclosure in its entirety.

THE DRAWINGS

These and other features and advantages of the present invention will become more readily appreciated when considered in connection with the following detailed description and appended drawings, wherein:

FIG. 1 is a partially cross-sectioned perspective view representing a presently preferred embodiment of a monobloc piston assembly embodying the present invention;

FIG. 2 is a view similar to FIG. 1 looking in the direction of arrow 2 in FIG. 1;

Figure 4:
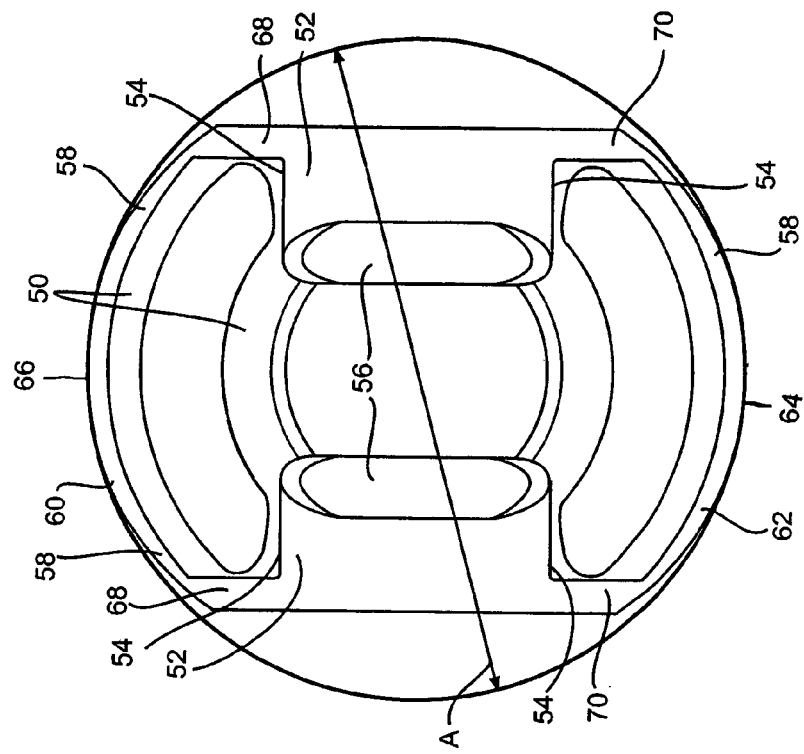
Figure 5:
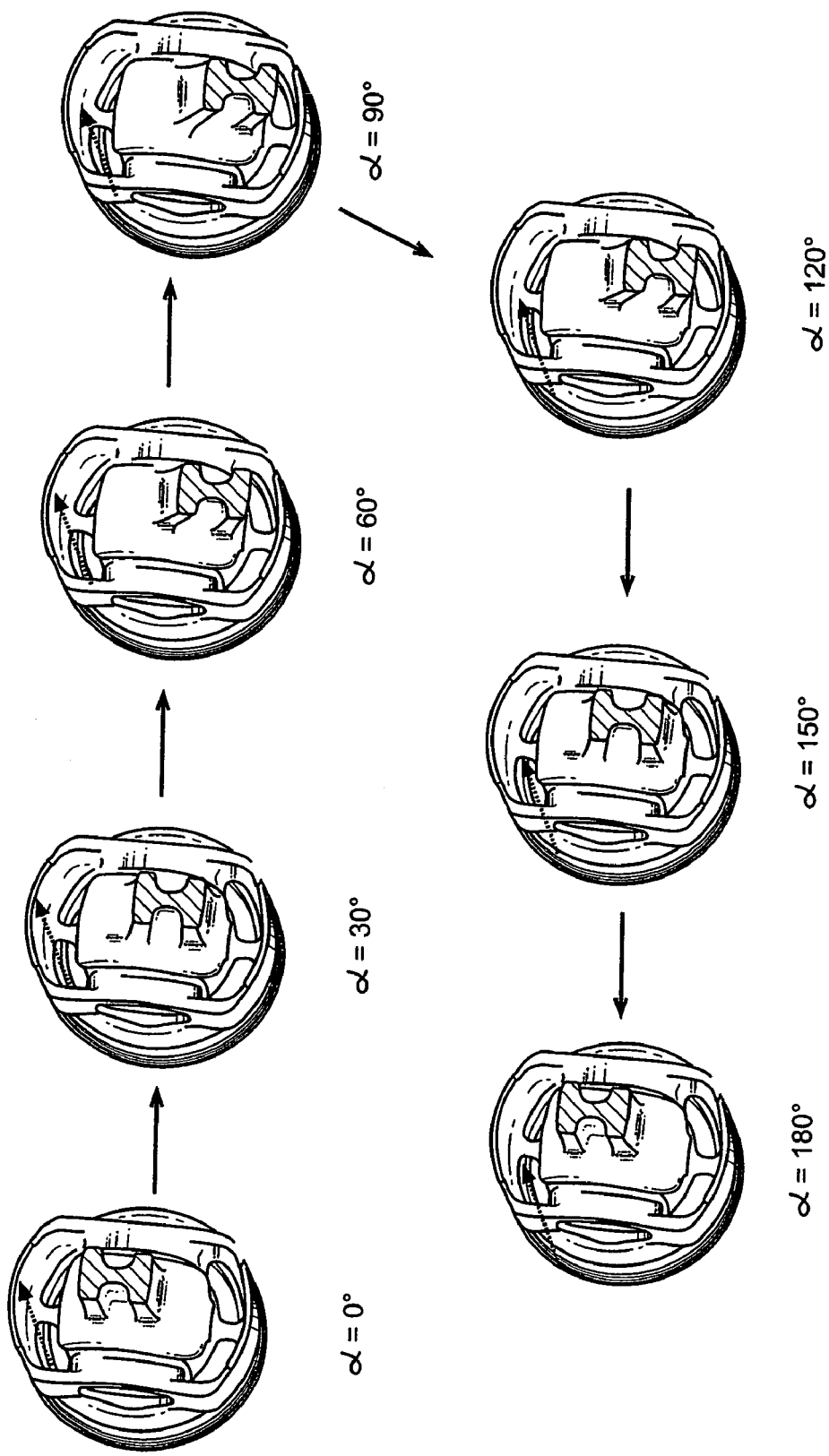

FIG. 4 is a bottom view of an alternative embodiment of a monobloc piston assembly embodying a presently preferred construction of the invention; and FIG. 5 is a series of isometric views of a monobloc piston assembly embodying a presently preferred construction of the invention showing the management of oil flow injected from an inclined oil jet during a complete stroke cycle of the piston assembly.

DETAILED DESCRIPTION OF THE PREFERRED EMBODIMENTS

A presently preferred embodiment of a monobloc piston assembly constructed according to the present invention is shown generally at 10 in FIGS. 1–3 and 5. The monobloc piston assembly 10 has at least two parts, represented here as an upper crown 12 and a lower crown 14, fixedly joined together forming a piston body 16 extending along a longitudinal axis 18. An oil cooling gallery 20 is constructed upon joining of the upper crown 12 to the lower crown 14. At least one elongated opening and preferably a plurality of elongated openings 22, 24 enter the oil cooling gallery 20 providing for oil flow into and out of the oil cooling gallery 20. The elongated openings 22, 24 allow the assembly 10 to be incorporated into internal combustion engine applications having either vertical or inclined oil jets that direct oil either directly toward or generally toward the oil cooling gallery 20 of the assembly 10.

Figure 3:
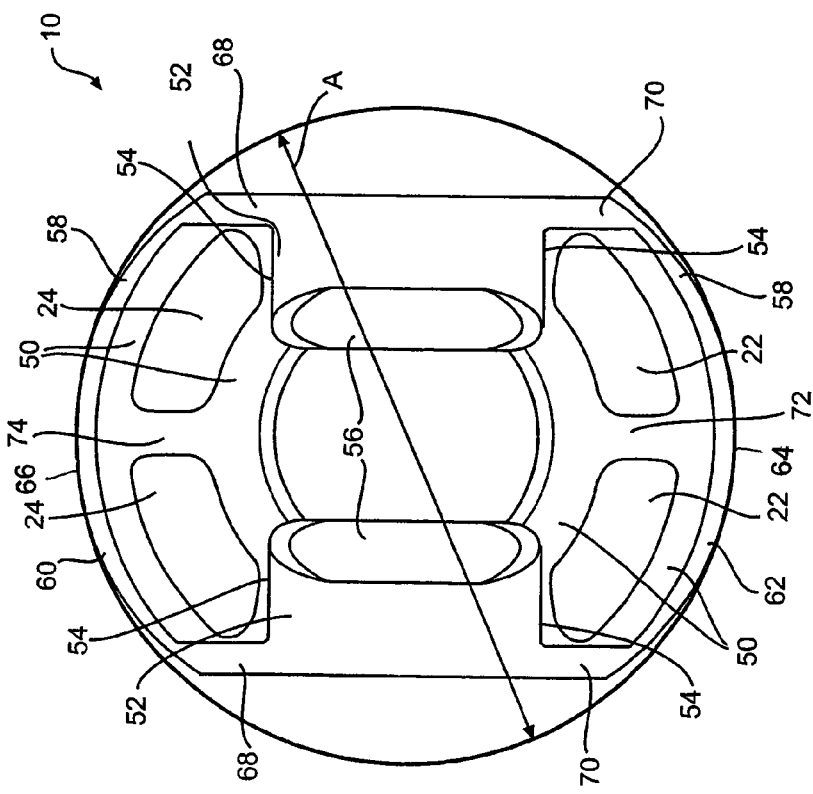
FIG. 3 is a bottom view showing the monobloc piston assembly of FIG. 1.

As best shown in FIGS. 1 and 2, the upper crown 12 has an upper combustion wall 26 preferably having an inner annular wall 28 and an outer annular wall 30 depending therefrom and terminating at ends 29, 31, respectively. The upper combustion wall 26 has an upper surface 32 and a lower surface 34. The upper surface 32 is constructed to form a combustion bowl 36. The outer annular wall 30 has a generally cylindrical outer surface 38 defining at least in part a ring belt 40 preferably having a pair of annular grooves 42 for receiving piston rings (not shown). As shown in FIG. 3, the ring belt 40 is constructed having a dimension, represented here as a diameter A, providing for a sliding fit along the longitudinal axis 18 within a cylinder bore (not shown).

The lower crown 14 has a generally cylindrical outer annular wall 44 terminating at an end 46. The end 46 is preferably arranged for fixed attachment to the end 31 of the outer annular wall 30 of the upper crown 12. Preferably, an inner annular wall 48 terminating at an end 49 is spaced radially inwardly from the outer annular wall 44. The end 49 is preferably arranged for fixed attachment to the end 29 of the inner annular wall 28 of the upper crown 12. A lower wall 50 joins the outer annular wall 44 to the inner annular wall 48. Preferably, the outer annular wall 44 has an annular groove 51 constructed to receive a seal (not shown) therein for sealing engagement within the cylinder bore. The outer wall 44 is preferably constructed having a dimension, represented here as a diameter, substantially similar to diameter A of the upper crown 12, thereby defining at least in part the ring belt 40.

The lower crown 14 has a pair of pin bosses 52 depending from the lower wall 50. The pin bosses 52 each have an outer surface 54 and an opening 56 for receiving a wrist pin (not shown) therein. Preferably, a skirt 58 is formed as one piece and of the same material with the pin bosses 52 and extends radially outwardly from the outer surface 54 of the pin bosses 52.

As best shown in FIGS. 3 and 4, the skirt 58 preferably has a pair of opposite walls 60, 62, with each wall having an outer surface 64, 66, respectively. The outer surfaces 64, 66 are preferably shaped having a dimension, represented here as a diameter, similar to diameter A of the ring belt 40. The walls 60, 62 each have leg portions 68, 70, respectively, connecting the walls 60, 62 to the pin bosses 52.

In assembly, the upper crown 12 is fixedly attached to the lower crown 14 preferably by friction welding. It should be recognized however, that other welding techniques could be used as well as other joining means, such as other welding or brazing techniques, adhesives, bolts, or the like to fixedly attach the upper crown 12 to the lower crown 14 and such are contemplated by the invention. Upon joining the two parts to one another, the outer annular wall 30 of the upper crown 12 and the outer annular wall 44 of the lower crown 14 are fixedly joined to one another at their respective ends 31, 46. At the same time, the inner annular wall 28 of the upper crown 12 and the inner annular wall 48 of the lower crown 14 are fixedly joined to one another at their respective ends 29, 49. As a result, the oil cooling gallery 20 is defined by the upper wall 26, the outer annular walls 30, 44, the inner annular walls 28, 48, and the lower wall 50.

The openings 22, 24 are formed in the lower wall 50 radially inwardly of the skirt walls 60, 62 and generally between the pin bosses 52. The openings 22, 24 extend between the pin bosses 52 in the regions enclosed by the skirt walls 60, 62 and the leg portions 68, 70, and do not extend within the region of the lower wall 50 to which the pin bosses 52 are attached. Preferably, each opening 22, 24 has a rib 72, 74, respectively, and the ribs 72, 74 preferably bisect each opening 22, 24 into two equally sized openings.

The ribs 72, 74 that bisect the openings 22, 24 enhance the stiffness of the skirt 58 by limiting deflection of the outer annular wall 44 of the lower crown 14 and the walls 60, 62 of the skirt 58. This is particularly desirable in heavy-duty diesel engine applications where extreme loads are typically encountered between the skirt 58 and the cylinder bore. At the same time, the ribs 72, 74 provide for adequate oil flow into and out of the openings 22, 24. It should be recognized, that though one rib 72, 74 is shown bisecting each opening 22, 24, respectively, that any number of ribs could be provided, or the ribs may be eliminated altogether providing for a pair of continuous openings, as shown in an alternate embodiment in FIG. 4.

The elongated openings 22, 24 provide for oil flow into the gallery 20 where the oil is injected either toward the openings 22, 24 from an inclined angle relative to the axis 18, or vertically toward the openings 22, 24. Therefore, the monobloc piston assembly 10 can be used in applications where oil injection jets are at an inclined or vertical orientation relative to the axis 18. As such, the monobloc piston assembly 10 is able to receive oil within the gallery 20 from oil injectors inclined relative to the axis 18 throughout the stroke of the monobloc piston assembly 10 within the cylinder bore (not shown), as best shown in FIG. 5.

Turning in particular to FIG. 5, it will be seen how the monobloc piston 10 constructed according to the present invention is able to receive a stream of oil into the oil cooling gallery over a substantial portion of the stroke of the piston 10 injected from below from an oil jet fixed at an angle relative to an axis of the piston 10. Normally, applications calling for an angled oil jet are fitted with an articulated-style of piston having a cooling gallery that is fully open at the bottom. The monobloc piston 10 of the present invention, modified with the enhanced oil cooling passage or passages 22, 24, enables it to be used either as original equipment or retrofitted to engines previously fitted with articulated pistons having angled oil jets. Most monobloc pistons have a comparatively small circular opening to receive cooling oil delivered from below by a jet that is parallel with the stroke axis of the piston. Such monobloc pistons would suffer from insufficient cooling in an environment where the oil jets are angled, since there would be very little opportunity for cooling oil to enter the small opening (at two points in the full stroke path).

Various phases of the stroke of the piston 10 are shown in FIG. 5. The first position shown represents a 0° crank angle with the piston 10 positioned at top dead center of its stroke. It will be seen that the oil stream delivered from the jet (illustrated by the dashed arrow) comes from below and strikes the inside of the skirt 58, where it is deflected at least in part into the gallery 20 through the opening 24 to provide cooling to the upper part of the piston 10 exposed to the heat of combustion. At 90° crank angle, the oil stream strikes the rib 74 and again is deflected at least in part into the gallery 20 through the opening 24. As the piston moves into a position of 120° crank angle, the oil stream hits directly into the colling gallery 20 through the opening 24. This direct hit continues to 180° crank angle, where the outside of the skirt 58 begins to block the path of oil. This position represents bottom dead center of the piston 10 where it is least in need of cooling from the oil, so the blockage or partial blockage from the skirt 58 does not present a problem for proper cooling of the piston. Advantageously, this position creates an opportunity for lubricating the pin bores 56 of the piston 10. As the piston 10 progresses beyond the 180° position toward 360° crank position (full revolution back at top dead center) the piston takes the reverse path shown in FIG. 5 and thus the same cooling cycle takes place, only in reverse order as described from 0°–180° above.

Though the elongated openings 22, 24 span a substantial portion of the distance between the pin bosses 52, at least a portion of the oil cooling gallery 20 is closed where the pin bosses 52 depend from the lower wall 50. As such, oil is maintained at least momentarily within the gallery 20 to enhance cooling of the monobloc piston assembly 10, particularly in the ring belt 40 region.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A monobloc piston assembly, comprising:
separately fabricated upper and lower piston crown parts joined together to form an oil cooling gallery boxed by a top wall, a pair of radially spaced side walls and a bottom wall;
a pair of pin bosses fabricated as one piece with said lower crown part;
a piston skirt fabricated as one piece with said lower crown part; and
at least one oil passage slot formed in a region of said bottom wall extending between said pin bosses on at least one side of said piston assembly and having a length in the circumferential direction of said piston assembly that is greater than a with of said at least one oil passage in a radial direction of said piston assembly.

2. The assembly of claim 1 wherein said oil cooling gallery is substantially open to the bottom on opposite sides of said piston assembly between said pin bosses.

3. The assembly of claim 1 wherein said oil cooling gallery is substantially closed in regions extending across said pin bosses.

4. The assembly of claim 1 wherein said piston skirt extends between said pin bosses and said at least one oil passage is disposed radially inwardly of said piston skirt.

5. The assembly of claim 1 wherein said at least one oil passage has a length in the circumferential direction of the piston assembly that is at least twice as great as a width of said at least one oil passage in a radial direction of said piston.

6. The assembly of claim 1 wherein said oil passage extends substantially between said pin bosses.

7. The assembly of claim 1 including at least one reinforcement web extending radially of said piston assembly and dividing said oil passage into at least two adjacent portions.

8. The assembly of claim 7 wherein said reinforcement web is substantially perpendicular to a common axis of said pin bosses.

9. The assembly of claim 1 wherein said oil passage is arcuate in shape.

10. The assembly of claim 1 wherein said upper and lower crown parts are fabricated of steel.

11. The assembly of claim 1 wherein said lower wall is fabricated as one piece with said piston skirt.

12. The assembly of claim 1 wherein there are said oil passages provided on opposite sides of said piston assembly between said pin bosses which are balanced with respect to one another.

13. The assembly of claim 12 wherein said opposite oil passages are symmetrical.

14. The assembly of claim 1 wherein said upper and lower crown parts are joined by welding.

15. The assembly of claim 1 wherein said upper and lower crown parts are joined by friction welding.

16. The assembly of claim 1 wherein said upper crown part includes a plurality of ring grooves and combustion bowl.

17. The assembly of claim 16 wherein said upper crown part includes a plurality of valve pockets.

18. The assembly of claim 1 wherein said oil passages extend no further than said piston skirt.

19. A monobloc piston assembly, comprising:
separately fabricated upper and lower piston crown parts joined together to form an oil cooling gallery boxed by a top wall, a pair of radially spaced side walls and a bottom wall;
a pair of pin bosses fabricated as one piece with said lower crown part;
a piston skirt fabricated as one piece with said lower crown part; and
at least one oil passage slot formed in a region of said bottom wall extending between said pin bosses on at least one side of said piston assembly having a length in the circumferential direction of the piston assembly that is at least twice as great as a with of said at least one oil passage in a radial direction of said piston.

20. A monobloc piston assembly, comprising:
separately fabricated upper and lower piston crown parts joined together to form an oil cooling gallery boxed by a top wall, a pair of radially spaced side walls and a bottom wall;
a pair of pin bosses fabricated as one piece with said lower crown part;
a piston skirt fabricated as one piece with said lower crown part; and
at least one oil passage slot formed in a region of said bottom wall extending between said pin bosses on at least one side of said piston assembly and including at least one reinforcement web extending radially of said piston assembly dividing said oil passage into at least two adjacent portion.

* * * * *